Jan. 5, 1926. 1,568,607
J. JUNKUNC
LIMB SECURING DEVICE FOR CHRISTMAS TREES
Filed Sept. 11, 1924
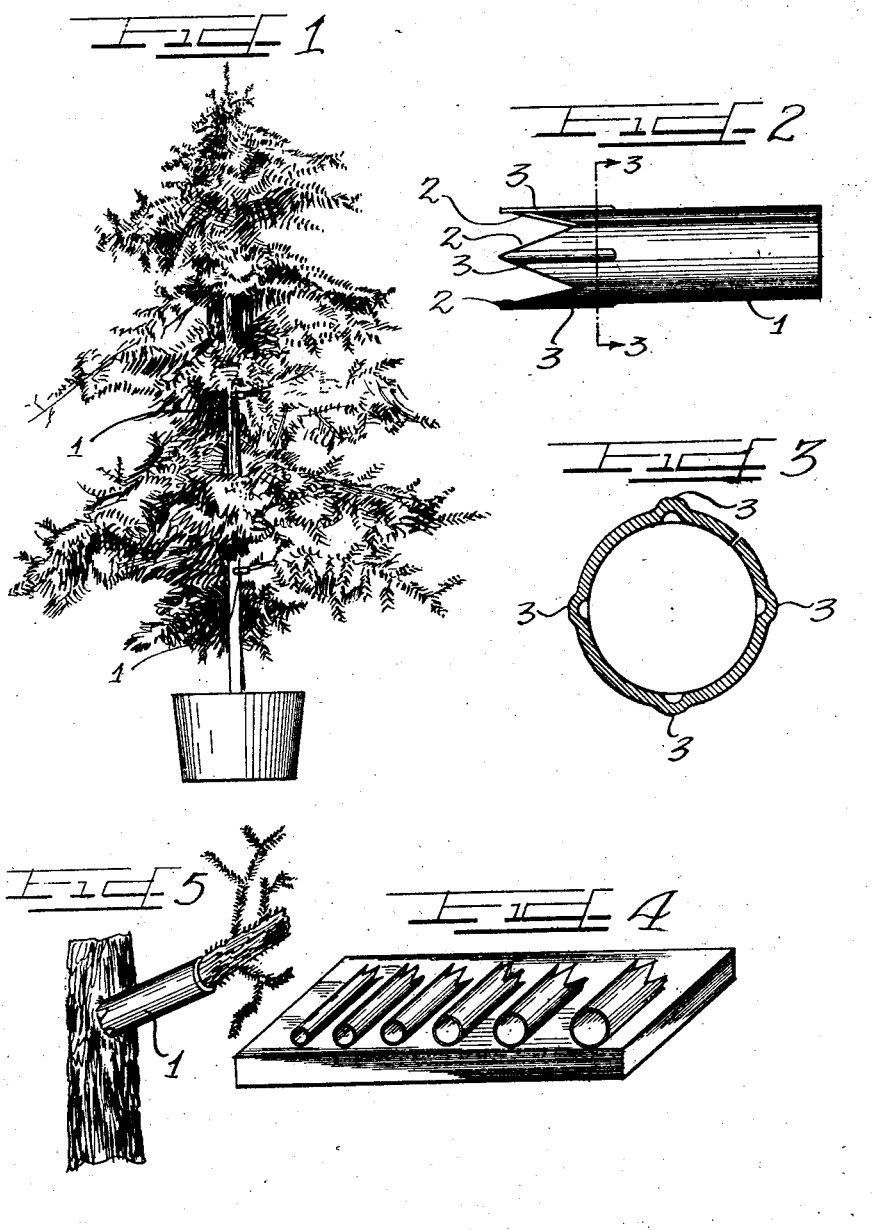

Patented Jan. 5, 1926.

1,568,607

UNITED STATES PATENT OFFICE.

JOHN JUNKUNC, OF CHICAGO, ILLINOIS.

LIMB-SECURING DEVICE FOR CHRISTMAS TREES.

Application filed September 11, 1924. Serial No. 737,024.

*To all whom it may concern:*

Be it known that I, JOHN JUNKUNC, a citizen of the United States, and a resident of the city of Chicago, in the county of Cook and State of Illinois, have invented certain new and useful Improvements in a Limb-Securing Device for Christmas Trees; and I hereby declare that the following is a full, clear, and exact description of the same, reference being had to the accompanying drawings, and to the numerals of reference marked thereon, which form a part of this specification.

This invention relates to a device for securing limbs to trees and more particularly to natural trees which have been cut and are displayed temporarily for decorative purposes such as Christmas trees.

It has been found that trees, particularly those adapted to be used as Christmas trees, frequently grow with the branches and limbs more on one side of the trunk than on the other so that it would improve the appearance of the tree considerably to be able to remove some of the limbs and branches from the more abundant portions and distribute them more evenly and artistically along the other less abundant portions of the trunk.

It is therefore the object of this invention to provide a means for attaching and securing limbs and branches which have been cut from one portion of a tree to another portion of a tree and for restoring broken branches to their original position on the tree.

It is also an object of this invention to provide a device of this class which may be easily and cheaply manufactured.

It is a further important object of this invention to provide a simple ferrule for this purpose adapted to receive limbs and having reinforced prongs for attaching the same to a tree.

Other and further important objects of this invention will be apparent from the disclosures in the specification and the accompanying drawings.

This invention (in a preferred form) is illustrated in the drawings and hereinafter more fully described.

On the drawings:

Figure 1 shows a Christmas tree on which the device is in use.

Figure 2 is a horizontal view of the device.

Figure 3 is a section along the line 3—3 of Figure 2.

Figure 4 is a perspective view showing a variety of sizes of the device.

Figure 5 is a detail view of the device in use.

As shown on the drawings:

The device is preferably formed of a simple sheet of metal which is rolled into a cylindrical member 1 shown in Figure 2, but may be drawn to this shape. The cylinder member 1 has cut on one end a plurality of prongs 2 which are reinforced by ridges 3 stamped along said prongs.

The limbs or branches are inserted in the member 1 which is then stuck into the tree to improve the appearance of the latter as shown in Figure 1 and more in detail in Figure 5. The devices may be made of various sizes as shown in Figure 4 to accommodate various sizes of limbs and branches.

It will be seen that this little device is very simple and may be cheaply manufactured. It is also apparent that it is of great help in improving the appearance of the tree.

The device of this invention as will be readily understood may be rolled, drawn, cut from tubing or formed in any suitable manner, from any suitable material.

In addition to the use described, this device is also useful for a variety of purposes such as holding flags or the like or whenever it is desired to support a smaller member on a larger member.

I am aware that many changes may be made and numerous details of construction may be varied through a wide range without departing from the principles of this invention, and I therefore do not purpose limiting the patent granted hereon otherwise than necessitated by the prior art.

I claim as my invention:

A limb securing device comprising a cylindrical member adapted to receive limbs therein and a plurality of prongs on one end of said member and ridges integral with said prongs for reinforcing the same.

In testimony whereof I have hereunto subscribed my name.

JOHN JUNKUNC.